United States Patent [19]

Hing et al.

[11] 4,354,964

[45] Oct. 19, 1982

[54] CERMET MATERIALS

[75] Inventors: Peter Hing, Birstall; Ronald Kay, East Goscote, both of England

[73] Assignee: Thorn Emi Limited, London, England

[21] Appl. No.: 205,094

[22] Filed: Nov. 10, 1980

[30] Foreign Application Priority Data

Nov. 12, 1979 [GB] United Kingdom ............... 7939090

[51] Int. Cl.$^3$ ............................................. H01B 1/06
[52] U.S. Cl. ...................................... 252/518; 252/512; 252/513; 252/515; 252/521; 501/118; 501/152
[58] Field of Search ............... 252/500, 512, 513, 515, 252/518, 521; 106/55, 58, 62, 73.4, 73.2

[56] References Cited

FOREIGN PATENT DOCUMENTS 1571084 7/1980 United Kingdom .

Primary Examiner—Joseph L. Schofer
Assistant Examiner—J. L. Barr
Attorney, Agent, or Firm—Fleit & Jacobson

[57] ABSTRACT

An electrically conducting cermet comprises a sintered compact of refractory oxide granules such as alumina granules having diameters of from 50 to 800 microns and a conductive network extending through the cermet and provided by a layer of one or more of titanium, zirconium, hafnium, vanadium, niobium, tantalum, chromium, molybdenum, tungsten, iron, cobalt or nickel surrounding the individual oxide granules and constituting a volume fraction of 0.04 to 0.2 of the total cermet, wherein particles of one or more of said metals are dispersed within the oxide granules in a volume fraction of 0.01 to 0.15 of the granules, which granules also contain 0.01 to 0.25 percent by weight of magnesium oxide.

12 Claims, No Drawings

CERMET MATERIALS

The present invention relates to cermet materials, and in particular to cermets having electrical conductivity and suitable for use in end closures for ceramic envelopes of electric discharge lamps.

In our U.K. Spcification No. 1571084 we have described and claimed electrically conducting cermets comprising refractory oxide granules, such as alumina, and finer particles of a Transition metal of Groups 4B to 7B and 8 for example tungsten or molybdenum, the metal particles forming a particular layer surrounding the individual oxide granules which constitutes a conducting network extending throughout the cermet. These conducting cermets can have a volume fraction of metal below 0.2 and as low as 0.045. We have also described how such cermets can be made, notably by rolling together the oxide granules and the finer metal powder until the granules are coated with the powder, compacting the coated granules and sintering, especially in the range 1600°–1800° C. The oxide granules themselves are preferably made by agglomerating finer particles of an oxide such as alumina by a rolling operation until agglomerate granules of the desired dimensions are obtained.

In further studies of these cermets we have found that higher density products are obtained if the 'green' compact is sintered at about 1800° C. or above. Such high sintering temperatures, however, lead to rapid grain growth in the ceramic constituent, such as alumina, yttria or a spinel, leading to abnormally large grains. It is well known in the art that the strength of sintered materials, particularly ceramic materials, decreases rapidly as the grain size increases. Moreover, the development of very large ceramic grains leads to the formation of pores or voids at triple grain junctions and at grain boundaries, and these voids act as stress-raisers. In the case of anisotropic materials, such as alumina, excessively large grains generate internal stresses owing to anisotropy of thermal expansion characteristics. These factors combine to give rise to extensive grain boundary separation and microcracking. Although sintering at about 1600° can produce a structure of fine or medium grains, such sintering temperatures do not develop as strong a bond between the alumina and the refractory metals as the temperatures within the range of 1800° C. to 1975° C.

In our said U.K. Specification we recommend the incorporation of a small amount of magnesia in the formation of agglomerated granules from finer particles of alumina, because this controls to a limited extent the grain growth in the ceramic islands, but its effectiveness decreases as the sintering temperature increases, mainly owing to rapid volatilization of the magnesia. If the content of magnesia is increased, cavities tend to be formed and the mechanical strength of the materials thereby impaired.

In accordance with this invention it has now been found that grain growth in the ceramic islands in a conducting cermet can be controlled by dispersing a minor amount of a refractory metal within the refractory oxide granules from which the cermet is prepared. This is conveniently done by incorporating the metal particles prior to agglomerating the fine oxide particles to form granules of the desired size.

Thus the invention provides an electrically conducting cermet comprising a sintered compact of granules of a refractory oxide such as aluminum oxide, yttrium oxide or a spinel, said granules having diameters of from 50 to 800 microns and a conductive network extending throughout the cermet and provided by a layer of at least one metal selected from Group 4B (titanium, zirconium and hafnium), Group 5B (vanadium, niobium and tantalum), Group 6B (chromium, molybdenum and tungsten), iron, cobalt and nickel, said layer constituting a volume fraction of from 0.04 to 0.2 of the total cermet, wherein there is dispersed within the refractory oxide granules (a) particles of at least one metal selected from titanium, zirconium, hafnium, vanadium, niobium, tantalum, chromium, molybdenum, tungsten, iron, cobalt and nickel in a volume fraction of from 0.01 to 0.15 of the total volume of the granules and (b) from 0.01 to 0.25 percent by weight of the refractory oxide of finely divided magnesium oxide.

The modification of the microstructure of the oxide granules or ceramic islands in these cermets, brought about by the invention, has led to substantial improvement in the overall mechanical properties of the cermet materials. It has also enabled strong, electrically conducting cermet components to be fabricated with a very low level of rejects due to leaks or microcracking. The cermets according to this invention possess a high degree of resistance to thermal shock which may be demonstrated by subjecting components comprising the cermets to a thermal cycling procedure which involves heating the components in an inert atmosphere to an elevated temperature, then cooling to about 100° C., reheating to the elevated temperature and repeating the heating and cooling cycle for up to 1000 times. The elevated temperature will correspond to the temperature to be expected during operation in a lamp and may be between 800° C. and 1500° C. In a typical example an elevated temperature of 1000° C. is used. In all cases it was found that no leaks had developed since on testing with a Tesla coil no nitrogen within the tube was detected. The present invention thus eliminates the need to subject each individual cermet component to an extensive leak testing procedure before use.

Our cermets normally have a resistivity of less than 1 ohm. cm.

The particular cermet for use in a lamp can be chosen to have a coefficient of thermal expansion intermediate between that of the envelope of the lamp and any metallic component which may be embedded in the cermet. For example, when using a cermet comprising, as the refractory oxide, alumina and, as the metal (both within and surrounding the granules, tungsten this is found to have a thermal expansion coefficient of from 50-85·$10^{-7}$/°C. over the range of 100°–1000° C. Over this same temperature range polycrystalline alumina (from which the envelope may be made in this case) has an expansion coefficient of from 50–95·$10^{-7}$/°C. and tungsten and molybdenum (rods of which may be embedded in the cermet) have an expansion coefficients respectively of from 42–50 and 45–60·$10^{-7}$/°C. A component comprising these three constituents is nevertheless found to be leak-tight in the test referred to above and also to be impermeable to ultra-violet sensitive dyes and to helium gas. It is believed that this resistance to internal stress and the generally improved mechanical strength and reproducibility of these components is due to the limited grain growth which occurs within the refractory oxide granules of the cermets of our invention.

The size distribution of the granules comprised in the cermets of the present invention may be over a range narrower than the broad range of 50 to 800 microns since, under certain conditions of processing the latter may tend to separate into distinct layers. For example, ranges of from 50 to 250, 50 to 500, 100 to 400 or 300 to 800 microns may be used. Particularly preferred are granules of from 50 to 500 microns which also have a mean diameter in the range of from 225 to 250 microns. The materials prepared from such granules are found to be stronger than those prepared from granules having a mean diameter of about 500 microns.

Typical cermets of this invention comprise metal particles with a size distribution in the range of from 0.1 to 15 microns dispersed within the refractory oxide granules and metal particles with a size distribution in the range of from 0.1 to 12 microns forming the layer surrounding the refractory oxide granules. The mean particle size of the metal particles used in each case is from 1 to 5 microns.

It is found that, in order to achieve the advantages of the present invention, a volume fraction of at least 0.01 of said metal must be incorporated within said refractory oxide granules but that at volume fractions above 0.15, the metal dispersed within the oxide granules has a tendency to promote cracking of the sintered cermet. It is believed that the metal particles inhibit the grain growth of the refractory oxide and that this inhibiting effect increases as the number of particles are increased. We have found that a particularly useful amount of metal is that giving a volume fraction of 0.02.

There may additionally be dispersed within the refractory oxide granules from 0.01 to 0.25 percent by weight of the total weight of the refractory oxide of an oxide of a rare earth, for example yttrium oxide or ytterbium oxide. In certain cases this additional material may improve the sinterability of the refractory oxide.

Whilst the present invention covers the possibility of the conductive network comprising a mixture of more than one of said metals and/or a mixture of more than one of said metals being disposed within said refractory oxide granules, it is generally convenient to use only one of said metals in each case. Preferably the internally disposed metal and the externally coated metal are the same.

We have found that niobium, tantalum, molybdenum and tungsten are the preferred metals and that tantalum, molybdenum and tungsten are particularly useful. Since tungsten is commonly used in electrodes in lamps, this material is particularly preferred.

Since the cermets of this invention are particularly suited to use as end closure components for ceramic discharge lamp envelopes and since a common material from which such envelopes are made is alumina, the preferred refractory oxide is alumina. Any form of alumina may be used but it is convenient to use a material which is alredy in crystalline form for example in the alpha (hexagonal) or gamma (cubic) crystalline form. A powdered alumina of sub-micron mean particles size, for example of the order of 0.3 microns is found to be a particularly convenient starting material.

According to the invention we also provide a method of making an electrically conducting cermet which comprises the steps of (a) mixing particles of a refractory oxide selected from aluminium oxide, yttrium oxide and a spinel with particles of at least one metal selected from titanium, zirconium, hafnium, vanadium, niobium, tantalum, chromium, molybdenum, tungsten, iron, cobalt and nickel in such a quantity as to constitute a volume fraction of from 0.01 to 0.15 of the resultant mixture and with 0.01 to 0.25 percent by weight of the refractory oxide of finely divided magnesium oxide, (b) agglomerating said mixture to form oxide granules with said metal dispersed therein, (c) rolling said granules in a powder of at least one metal selected from titanium, zirconium, hafnium, vanadium, niobium, tantalum, chromium, molybdenum, tungsten, iron, cobalt and nickel until the granules acquire a coating of said metal powder which coating constitutes a volume fraction of from 0.04 to 0.20 of the total cermet, (d) compacting the coated granules into a coherent body and (e) sintering said body at a temperature of from 1800° to 1975° C. in an inert environment. Suitable inert environments include vacuum or an atmosphere of argon. A hydrogen atmosphere may alternatively be used for cermets containing certain metals e.g. tungsten or molybdenum but should not be used where, as in the case of tantalum, niobium, zirconium and titanium, embrittling hydrides may be formed. The compaction may be carried out under a pressure up to 20,000 p.s.i. (138 MN/m$^2$), conveniently about 11,500 p.s.i. (79 MN/m$^2$). Die pressing or isostatic pressing may be used. It is desirable to obtain as smooth a surface finish as possible at this stage.

After compaction and before sintering the coherent body may optionally be prefired at about 200° C. in air or at a higher temperature in an inert environment to increase the 'green strength' of the compact. This facilitates the handling of the compact and renders it less likely to be damaged during any machining operations which may be required before sintering.

One or more conductor rods or electrodes of a refractory metal, such as tungsten or molybdenum, can be partially embedded in the cermet body, either at the green or the prefired stage before sintering. Alternatively, such metal members can be pushed into blind holes in the sintered cermet body and make good electrical contact. In this way, end closures for arc tubes can be fabricated with electrode mountings and leads sealed into the closure, electrical contact being made through the conducting cermet region.

These integral cermet bodies with inserted metal rods can be thermally cycled up to 1500° C. without loss of hermeticity.

Agglomeration of the mixture of oxide particles, metal powder and finely divided magnesia may be carried out by dry mixing followed by wet milling a slurry of the mixture, drying in air and rolling or crushing through a mesh of appropriate size. Alternatively, the granules can be formed by spray drying the slurry described above, preferably with the addition of an organic binder, such as polyvinyl alcohol, for example in an amount of up to 2% by weight.

As stated above, the cermets of this invention are particularly suited to use as end closure components for ceramic discharge lamp envelopes, for example translucent polycrystalline alumina or synthetic sapphire tubes. The particular oxide used will of course be such that the expansion of the resultant cermet matches as closely as possible the expansion of the envelope in conjunction with which it is to be used. Our cermets are especially useful in discharge lamps containing metal vapours, such as sodium, or a wide range of metal halide vapours, such as sodium chloride, aluminium chloride, tin chloride, scandium iodide, rare-earth halides, mercuric chlorides and iodides. In these metal halide lamps, we particularly prefer to use cermets containing molybdenum, tungsten or tantalum rather than those containing niobium. Our cermets have been found to withstand repeated thermal cycling at elevated temperatures, such as occurs during lamp operation. Various forms of end closure and other lamp components are to be found in our U.K. Specification No. 1571084.

The invention is illustrated but in no way limited by the following examples:

EXAMPLE 1

(a) Preparation of refractory oxide granules

Alumina powder of 99.98% purity, largely in the alpha crystalline form, of mean particle size 0.3 microns and of surface area of 30 m$^2$/gram (type CR30 supplied by La Pierre Synthetique Baikowski) (750 g) together with tungsten (Lamp Metal) powder of 99.98% purity and of mean particle size of about 5 microns (75 g) and high purity finely divided (submicron size) magnesium oxide (0.375 g) were mixed in a tumbler mixer for an hour. The mixed powder was then stirred with distilled water (3 liters) and the slurry wet milled for 3 hours. The milled slurry was dried in trays under infra-red lamps (alternatively oven drying at 100° C. may be used) and the dried slurry pushed through a 710 micron aperture mesh. The resultant powder was rolled mechanically for 20 minutes in a polythene container to produce granules of size range 50 to 800 microns and then finally sized by passing through a 500 microns sieve to produce granules of size range 50 to 500 microns and of average diameter about 250 microns. The resultant granules contained tungsten in a volume fraction of 0.02 of the total volume of the granules in the form of particles of a mean particle size of 5 microns dispersed therein.

(b) Preparation of the cermet

The granules of alumina containing dispersed tungsten particles were rolled in tungsten powder of mean particles size about 5 microns until they were uniformly coated with a volume fraction of about 0.06 of the powder.

The coated granules were then compressed to form a coherent body or "green compact", preferably by isostatic compaction using a compacting pressure of up to 20,000 psi (138 MN/m$^2$) preferably about 11,500 psi (79 MN/m$^2$).

The green compact can be formed in the desired component shape, but the compacted material should advantageously have sufficient mechanical strength before sintering to enable the shaped compact to be worked to the desired form.

The green compact was then sintered for 2 hours in a furnace wherein the temperature was controlled within the range of 1800° to 1975° C. and in an atmosphere of hydrogen.

(c) Properties of the cermet component

The resultant cermet component had a coefficient of thermal expansion of from 50–85·10$^{-7}$/°C. over the range of 100°–1000° C. Repeated thermal cycling up to temperatures of 1500° C. led to no deterioration of the mechanical structure of the cermet and, when incorporated as an end seal of a lamp envelope, no loss of hemeticity. This performance was maintained when a rod of tungsten or of molybdenum was embedded in the cermet.

The mechanical strength of the cermet material produced was assessed on samples of the material produced as described above in the form of cylindrical rod 4 cm in length and 1 cm in diameter. These rods were submitted to a three point bending test wherein a span of about 3 cm of the rod between two supports was subjected to a load centrally applied at a rate of 1 mm/min. and the breaking load measured. From this breaking load the fracture stress was measured and found, on the material prepared according to this example, to be of the order of 280–300 MN/m$^2$. The electrical resistivity of the cermet was 10$^{-1}$ ohm. cm.

EXAMPLE 2

The method of Example 1(a) is repeated using in place of tungsten of mean particle size of about 5 microns, a tungsten (supplied by GTE Sylvania) of mean particle size of about 1 microns. The resultant granules were made up into a cermet by the procedure of Example 1(b) and the properties of this material were similar to those described in Example 1(c).

EXAMPLE 3

The method of Example 1(a) is repeated using in place of the tungsten of mean particle size of about 5 microns, tantalum powder (supplied by Kaweki Berylco Industries) of mean particle size of 3 microns (60 g.). The resultant granules were made up into a cermet by procedure of Example 1(b) and the properties of the resultant cermet were very similar to those described in 1(c). However, it was found that sintering in vacuum or argon atmosphere is necessary as hydrogen embrittled the tantalum by forming tantalum hydride.

EXAMPLE 4

The method of Example 1(a) is repeated using in place of the tungsten of mean particle size of about 5 microns, molybdenum powder (supplied by Murex, Rainham, Essex, England) of mean particle size of 1 micron (40 g.). The resultant granules were made up into a cermet by procedure of Example 1(b) and the properties of the resultant cermet particularly the electrical resistivity were very similar to those described in 1(c) when sintering was carried out either in a vacuum or in an argon or hydrogen atmosphere.

EXAMPLE 5

The method of Example 1(a) is repeated using in place of tungsten of mean particle size of about 5 microns niobium powder (supplied by Berkshire Ores & Chemicals Ltd.) of mean particle size of about 5 microns (33 g.). The resultant granules were made up into cermet by procedure of Example 1(b) and the properties of the resultant cermet, particularly the electrical resistivity were closely similar to those described in 1(c) when sintering were carried out preferably in vacuum or inert atmosphere.

EXAMPLE 6

(a) The method of Example 1(a) is repeated using in place of the tungsten of mean particle size of about 5 micron, tungsten powder (supplied by Koch Light) of mean particle size of about 1 micron (190 g.) to effect a volume fraction of 0.05 of tungsten within the alumina islands in the cermet materials. The resultant granules were made up into a cermet by procedure of 1(b) and the properties of the resultant cermet particularly the electrical resistivity were closely similar to those described in 1(c) with mean breaking strength of about 330 MN/m$^2$ and thermal expansion of 50 to 78·10$^{-7}$/°C. over the temperature range 100° C. to 1000° C.

(b) The Example of 1(a) is repeated but instead of the tungsten of mean particle of about 5 micron, there is used tungsten powder (supplied by Koch Light) of mean particle of 1 micron (350 g.) to effect a volume fraction of 0.10 of tungsten within the alumina islands in the cermet material. The resultant granules were made up into a cermet by the procedure of 1(b) and the overall properties of the resultant cermet were closely similar to those described in 1(c), except that, in this case, as the metal content in the alumina islands is increased, the breaking strength increases to about 350 MN/m$^2$ and the thermal expansion is about 50 to 75×10$^{-7}$/°C. in the range 100°–1000° C.

EXAMPLE 7

The method of Example 1(a) is repeated twice using 65 grams of tungsten (supplied by Lamp Metals) of mean particle size of about 5 microns. The resultant granules were made up into a cermet by the procedure of Example 1(b), using the appropriate amount of tungsten (supplied by Lamp Metals, Koch Light or GTE Sylvania) to increase the volume fraction of metal coating in one case to 0.10 and in the other case to 0.15 respectively. The overall properties of the resultant cermet materials were not markedly different to those described in 1(c). However, for volume fractions of tungsten metal content surrounding the alumina granules of 0.10 and 0.15, the thermal expansion in the range of 100°–1000° C. was respectively in the range of 50–7·5·10$^{-7}$/°C. and 50–70×10$^{-7}$/°C.

The electrical resistivity was not significantly altered with typical values no greater than 10$^{-2}$ ohm-cm.

EXAMPLE 8

The method of Example 1(a) is repeated with the addition of yttrium oxide (0.375 g.) to the initial mix. The resultant granules were made up into a cermet by the procedure of Example 1(b) and the properties of this material were similar to those described in Example 1(c).

EXAMPLE 9

Granules of alumina containing dispersed tungsten particles produced by the method of Example 1(a) (110 g.) were rolled in a mixture of tungsten powder of mean particle size about 5 microns (40 g.) and niobium powder of mean particle size about 5 microns (from Exsud Ltd.—20 g.) until they were uniformly coated with a volume fraction of about 0.175 of the powder.

The coated granules were then compressed to form a coherent body or "green compact" by die pressing using a pressure of about 11,500 psi (79 MN/m$^2$).

The green compact was then sintered for 2 hours in a furnace under vacuum wherein the temperature was controlled within the range of 1800° to 1975° C.

The resultant cermet had a coefficient of thermal expansion of from 50–80·10$^{-7}$/°C. over the range of 100°–1000° C.

What we claim is:

1. An electrically conducting cermet comprising a sintered compact of granules of refractory oxide selected from the group consisting of aluminum oxide, yttrium oxide and a spinel, said granules having diameters of from 50 to 800 microns, said granules being dispersed within a conductive network extending throughout the cermet, wherein said conductive network is constituted by a layer of particles surrounding said granules, said particles being of at least one metal selected from the group consisting of titanium, zirconium, hafnium, vanadium, niobium, tantalum, chromium, molybdenum, tungsten, iron, cobalt and nickel, and being of a particle size of from 0.1 to 12 microns, said layer constituting a volume fraction of from 0.04 to 0.2 of the total cermet, wherein there is dispersed, within the refractory oxide granules, (a) particles of at least one metal selected from the group consisting of titanium, zirconium, hafnium, vanadium, niobium, tantalum, chromium, molybdenum, tungsten, iron, cobalt and nickel, of a particle size of from 0.1 to 15 microns and in a volume fraction of from 0.01 to 0.15 of the total volume of the granules, and (b) from 0.01 to 0.25 percent by weight of the refractory oxide of finely divided magnesium oxide.

2. A cermet according to claim 1, wherein the diameters of said granules are from 50 to 500 microns.

3. A cermet according to claim 1 or claim 2, wherein the mean diameter of said granules is in the range of from 225 to 250 microns.

4. A cermet according to claim 1, wherein the mean particle size of the metal particles dispersed within the granules and forming said layer is from 1 to 5 microns.

5. A cermet according to claim 1, wherein there is additionally dispersed within the granules from 0.01 to 0.25 percent by weight of the total weight of the granules of a rare earth oxide.

6. A cermet according to claim 5, wherein said rare earth oxide is yttrium oxide or ytterbium oxide.

7. A cermet according to claim 1, wherein the conductive network comprises only one of said metals, and wherein the particles dispersed within said refractory oxide granules comprise only one of said metals.

8. A cermet according to claim 1, wherein said refractory oxide is aluminum oxide.

9. A cermet according to claim 1, wherein said conductive network comprises a layer of at least one metal selected from the group consisting of niobium, tantalum, molybdenum and tungsten, and wherein said metal particles dispersed within said refractory oxide granules are selected from the group consisting of at least one of niobium, tantalum, molybdenum, and tungsten.

10. A cermet according to claim 9, wherein said conductive network comprises a layer of at least one metal selected from the group consisting of tantalum, molybdenum and tungsten, and wherein said metal particles dispersed within said refractory oxide granules are selected from at least one of the group consisting of tantalum, molybdenum and tungsten.

11. A cermet according to claim 10, wherein said conductive network comprises a layer of tungsten, and wherein said metal particles dispersed within said refractory oxide granules are of tungsten.

12. A cermet according to claim 11, wherein the mean particle size of the tungsten particles in said layer which provides said conductive network is about 5 microns, and wherein said layer constitutes a volume fraction of about 0.06 of the total cermet.

* * * * *